United States Patent
Han

(10) Patent No.: US 6,351,830 B1
(45) Date of Patent: Feb. 26, 2002

(54) APPARATUS FOR CHECKING FOR DEFECT OF SERIAL COMMUNICATION DEVICES AND METHOD THEREOF

(75) Inventor: Chang Woo Han, Kumi (KR)

(73) Assignee: LG Electronics, Inc. (KR)

( * ) Notice: Subject to any disclaimer, the term of this patent is extended or adjusted under 35 U.S.C. 154(b) by 0 days.

(21) Appl. No.: 09/211,751

(22) Filed: Dec. 15, 1998

(30) Foreign Application Priority Data

Dec. 15, 1997 (KR) .............................................. 97/68684

(51) Int. Cl.7 ............................. G06F 11/22; G06F 11/07
(52) U.S. Cl. .............................................. 714/48; 714/5
(58) Field of Search ................................ 714/25, 48, 5, 714/30, 43, 733, 742, 743; 710/62, 72; 709/253; 713/100

(56) References Cited

U.S. PATENT DOCUMENTS

| | | | |
|---|---|---|---|
| 3,564,145 A | * | 2/1971 | Deutsch et al. |
| 4,263,580 A | * | 4/1981 | Sato et al. |
| 4,433,413 A | * | 2/1984 | Fasang |
| 4,814,970 A | * | 3/1989 | Barbagelata et al. |
| 5,944,803 A | * | 8/1999 | Whitehouse |

* cited by examiner

Primary Examiner—Gopal C. Ray
(74) Attorney, Agent, or Firm—Ostrolenk, Faber, Gerb & Soffen, LLP

(57) ABSTRACT

An apparatus for checking for a defect of a plurality of serial communication devices and a method thereof wherein a microprocessor is connected to the plurality of serial communication devices through a serial communication line, the serial communication devices are connected to one another in parallel, the microprocessor designates one of the serial communication devices through the serial communication line, and checks for a defect of a thusly designated serial communication device according to a response signal when receiving the response signal from the device, the serial communication devices use the response signal to communicate whether each device is defective, and a display unit externally displays a defect checking result.

12 Claims, 2 Drawing Sheets

US 6,351,830 B1

APPARATUS FOR CHECKING FOR DEFECT OF SERIAL COMMUNICATION DEVICES AND METHOD THEREOF

BACKGROUND OF THE INVENTION

1. Field of the Invention

The present invention is directed to a technique for checking for defects of devices which perform serial communication, and in particular to a technique for checking for defects of a plurality of serial communication devices during serial communication between the devices and a microprocessor employing a serial communication method.

2. Description of the Background Art

A microprocessor and communication devices used for an image display device such as a monitor, etc., employ a serial communication method for data communication, and may use a single serial communication line to carry out the serial communication. In this case, when a defect occurs in any of the communication devices, the other communication devices are interrupted from communicating with the microprocessor. As a result, the microprocessor and the communication devices cannot be normally operated. Accordingly, it is necessary to check for the defects of the serial communication devices.

In general, a user has to directly check for the defect of the serial communication devices by replacing all the devices one by one so as to find the defective device, which takes a great deal of time and effort of the user. As a result, efficiency in development and production of the products is reduced.

SUMMARY OF THE INVENTION

It is therefore a primary object of the present invention to provide an apparatus for checking for a defect of a plurality of serial communication devices connected to a microprocessor through a serial communication line, and a method thereof.

It is another object of the present invention to provide an apparatus for checking for a defect of a plurality of serial communication devices which can externally display which device among the serial communication devices is defective, and method thereof.

In order to achieve the above-described objects of the present invention, there is provided an apparatus for checking for a defect of a plurality of serial communication devices connected to a serial communication line in parallel, including: a microprocessor outputting a control signal to designate one of the serial communication devices through the serial communication line, and checking for a defect of a thusly designated serial communication device by a response signal upon receiving the response signal from the device.

In order to achieve the above-described objects of the present invention, there is also provided a method of checking for a defect of a plurality of serial communication devices, including: a first step for outputting a control signal from a microprocessor to the plurality of serial communication devices through a serial communication line to designate one of the serial communication devices; a second step for the plurality of serial communication devices receiving the control signal and determining which device among the said plurality of serial communication devices is designated by the control signal; a third step for sending response signals to the microprocessor in order to communicate whether each device is defective according to a result of the second step; and a fourth step for the microprocessor checking for a defect of a thusly designated serial communication device according to the response signal therefrom.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

Figure 1:
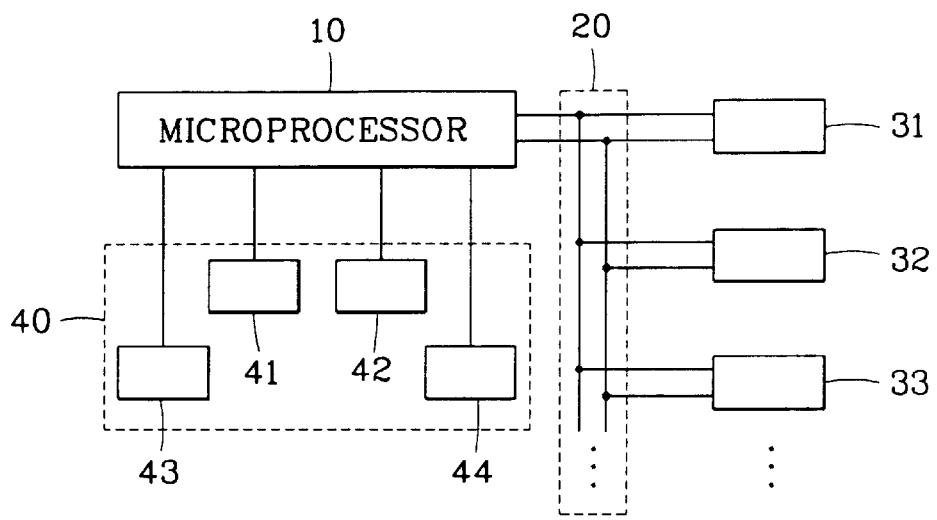
FIG. 1 is a schematic block diagram illustrating an apparatus for checking for defects of a serial communication device according to a first embodiment of the present invention.

FIG. 1 is a schematic block diagram illustrating an apparatus for checking for defects of a serial communication device according to a first embodiment of the present invention. As shown therein, a microprocessor 10 is connected to a plurality of serial communication devices 31, 32, 33 through a serial communication line 20, and the devices 31, 32, 33 are connected to one another in parallel. The microprocessor 10 serially communicates data with the plurality of serial communication devices 31, 32, 33, thus checking for a defect of the devices 31, 32, 33 through the serial communication line 20. The serial communication devices 31, 32, 33 can serially communicate with the microprocessor 10. In case the microprocessor 10 is used for image display, display devices may be employed as the serial communication devices 31, 32, 33.

The microprocessor 10 outputs a checking result as a defect signal. A display unit 40 serves to receive the defect signal and externally display a result thereof. Accordingly, a user is able to confirm which device among the serial communication devices is defective. Various kinds of devices may be used according to a display function. Reference numeral 41 designates a light emitting diode unit having a plurality of light emitting diodes. Reference numerals 42 and 43 designate an OSD (On Screen Display) and a pulse width modulator which modulates and outputs a pulse according to a checking result, respectively. Reference numeral 44 designates an input/output (I/O) unit changing a value of a specific pin of an externally-connected I/O port according to the checking result.

The operation of the apparatus for checking for a defect of the serial communication devices according to the first embodiment of the present invention will now be described in detail.

A communication protocol for serial communication is predetermined between the microprocessor 10 and the plurality of serial communication devices 31, 32, 33.

The microprocessor 10 outputs a data having a certain value as a control signal. The control signal includes an inherent address for selecting one of the devices 31, 32, 33. The control signal consists of 9 bit data, and 8 bits are used to carry an inherent address value. The respective serial communication devices internally each have their own unique address value. For convenience, it is presumed that the inherent address values of first and second serial communication devices 31, 32 are '36' and '72', respectively.

The microprocessor 10 outputs a control signal having the inherent address value '36' in order to check for a defect of the first serial communication device 31.

The control signal is inputted to the devices 31, 32, 33 via the serial communication line 20.

Each serial communication device 31, 32, 33 compares its own inherent address value with the inherent address value of the control signal, thereby determining which device among the serial communication devices 31, 32, 33 is selected. The control signal includes the inherent address value '36', and thus the first serial communication device 31 recognizes that it is selected. Meanwhile, the other serial communication devices 32, 33 are not operated because the inputted inherent address value is not identical to their inherent address value.

The first serial communication device 31 outputs a first response signal having a certain data format. The first response signal is a data consisting of 9 bits. 8 bits are used to carry its own inherent address value, and 1 bit is an acknowledge bit communicating whether it is defective. Here, for convenience, it is presumed that an acknowledge bit value is outputted as 'high' when the device is defective, and outputted as 'low' when the device is not defective. The acknowledge bit value may be oppositely set according to the design.

When the first serial communication device 31 is not operating normally, it outputs the first response signal having the inherent address value of '36' and the acknowledge bit value of 'high'.

The microprocessor 10 on receiving the first response signal checks the inherent address value '36', thereby determining that the first response signal is inputted from the first serial communication device 31. Also, the microprocessor 10 recognizes the acknowledge bit value of 'high', thereby determining that the device 31 is defective. Then, the microprocessor 10 outputs a defect signal to the display unit 40 according to the checking result.

As described above, the first serial communication device 31 communicates a defective condition thereof to the microprocessor 10 by outputting the first response signal thereto. However, the first serial communication device 31 may not output the response signal because it is not operating normally. Thus, the microprocessor 10 sets a predetermined time slightly longer than a time taken from the outputting of the control signal to the inputting of the response signals from each serial communication device. After outputting the control signal with the inherent address value of '36' of the first serial communication device 31, the microprocessor 10 counts the predetermined time. When the first response signal is not received from the first serial communication device 31 before the predetermined time elapses, the microprocessor 10 recognizes that a defect has occurred in the device 31 and outputs the defect signal to the display unit 40.

In case a light emitting diode corresponding to the first serial communication device 31 is turned on or a color thereof is changed in the light emitting diode unit 41 of the display unit 40 according to the defect signal, the user recognizes that the first serial communication device 31 is defective. The OSD 42 displays the defect of the device 31 on the display screen with the characters according to the defect signal. The pulse width modulator 43 modulates and outputs the pulse width according to the defect signal. The I/O unit 44 changes an output value of the externally-connected I/O port according to the defect signal, namely a level or frequency of the signal externally outputted through the I/O port. The user checks the signal outputted from the pulse width modulator 43 or I/O unit 44 by using an external device such as an oscilloscope, thereby confirming which serial communication device is defective. On the other hand, the four display units 41, 42, 43, 44 are all illustrated in FIG. 1. The display units may be used respectively, or the two or more display units may be employed at the same time for various displays or indications.

When a defect checking is completely performed on the first serial communication device 31, the microprocessor 10 outputs the control signal including the inherent address value of '72' in order to check for a defect of the second serial communication device, and counts the predetermined time. The second serial communication device 32 receiving the control signal outputs a second response signal. The microprocessor 10 determines whether the device 32 is defective according to the second response signal. In addition, when the second response signal is not received from the second serial communication device 32 within the predetermined time, the microprocessor 10 recognizes that a defect occurs in the device 32, and thus outputs the defect signal to the display unit 40.

The above-described process is carried out on all the serial communication devices 31, 32, 33, and thus a defective condition of each device 31, 32, 33 is completely checked for.

Figure 2:
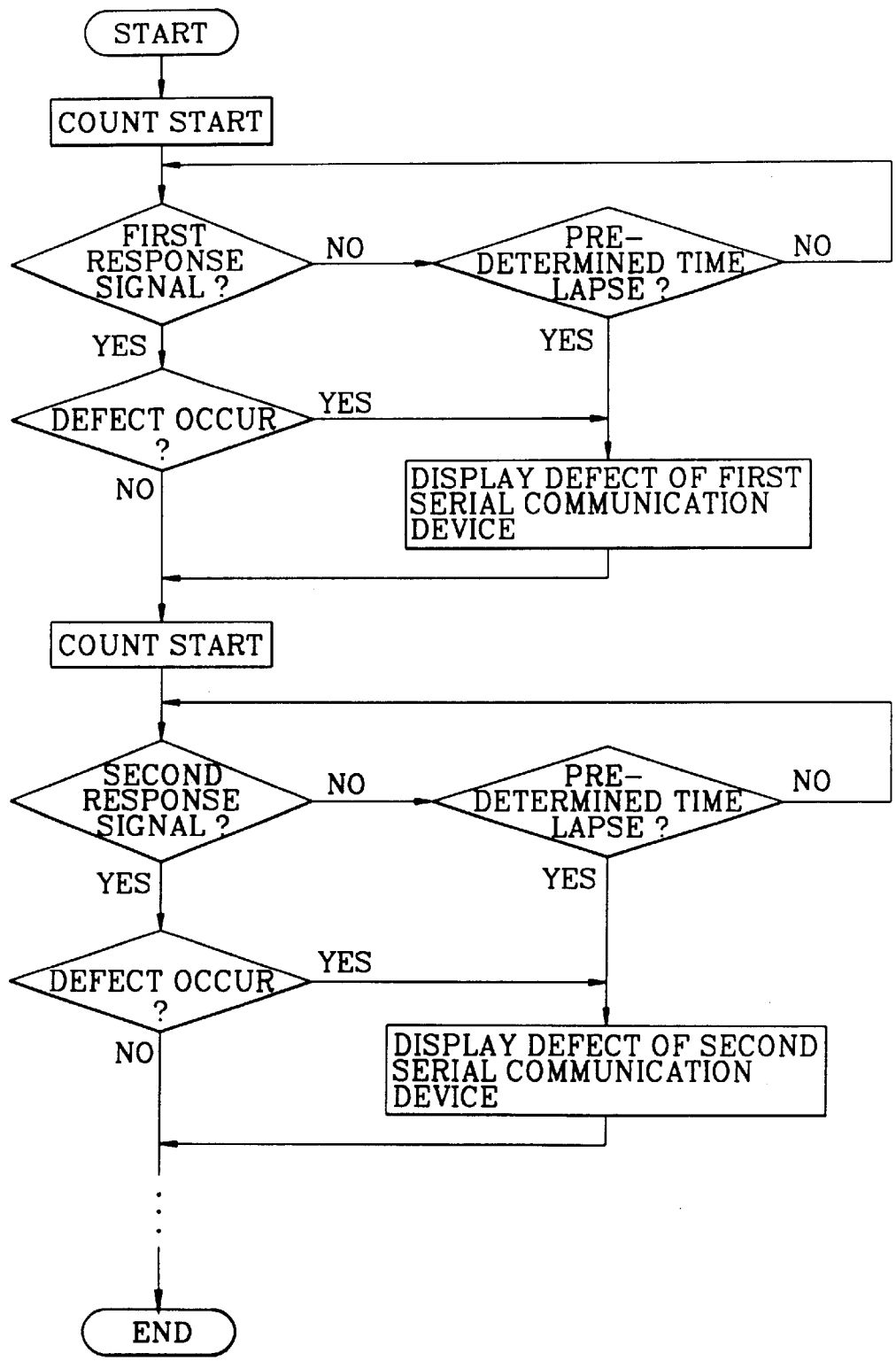
FIG. 2 is a flowchart of a method of checking for the defect of a serial communication device according to the first embodiment of the present invention.

FIG. 2 is a flowchart of a process of checking for a defect of the serial communication device according to the first embodiment of the present invention.

According to the above-described first embodiment of the present invention, a defect of one serial communication device is checked for and the checking result is displayed, and then the defect checking is carried out on a next serial communication device.

Figure 3:
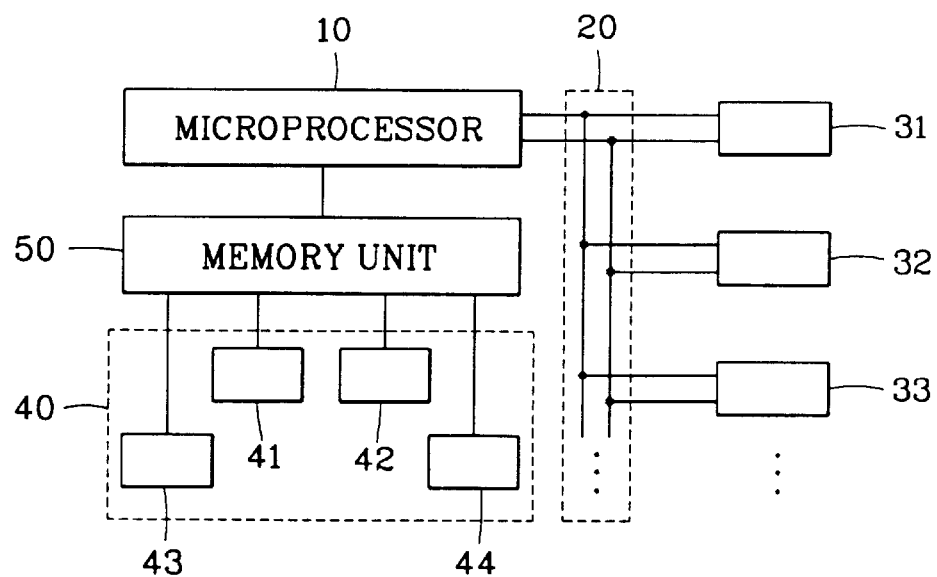
FIG. 3 is a schematic block diagram illustrating an apparatus for checking for defects of a serial communication device according to a second embodiment of the present invention.

In accordance with a second embodiment of the present invention, the defect checking is performed on all the serial communication devices, and the checking results are externally displayed at a time. As illustrated in FIG. 3, the apparatus illustrated in FIG. 1 further includes a memory unit 50 connected between the microprocessor 10 and display unit 40 for storing the checking results of the serial communication devices 31, 32, 33. When the apparatus is embodied, a RAM or the like in the microprocessor 10 may function as the memory unit 50.

The memory unit 50 includes memory storing spaces as many as the serial communication devices 31, 32, 33.

When completely checking the first serial communication device 31, the microprocessor 10 outputs the inherent address value and checking result of the device 31 to the memory unit 50.

A first storing space of the memory unit 50 is designated by the inherent address value, and the checking result of the first serial communication device 31 is stored therein. When the checking process is completely carried out on all the serial communication devices 31, 32, 33, the checking results of the devices 31, 32, 33 are stored in the storing spaces of the memory unit 50. The microprocessor 10 outputs a flag signal to the memory unit 50. The flag signal is a signal indicating that the defect checking for the serial communication devices is finished.

The memory unit 50 outputs the checking results of the serial communication devices 31, 32, 33 to the display unit 40 in response to the flag signal. The light emitting diode unit 41 of the display unit 40, the pulse width modulator 42, the OSD 43, or the I/O unit 44 are operated as described for the first embodiment of the present invention, and thus externally indicate which device among the serial communication devices is defective.

As discussed earlier, according to the present invention, a defect of the serial communication devices can be checked in the system itself, and a defect is directly informed when occurring in the serial communication device, which results in improved efficiency in production and service.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An apparatus for checking for a defect of a plurality of serial communication devices connected to a serial communication line in parallel, comprising:
   a microprocessor for outputting a control signal to designate one of the serial communication devices through the serial communication line, and for checking a defect of a thusly designated serial communication device by a response signal when receiving the response signal from the designated device, and for outputting a defect signal corresponding to the defective device;
   a display unit for externally indicating a defective serial communication device, and for converting a signal which is externally outputted through an input/output port according to the defect signal; and
   wherein the plurality of serial communication devices output the response signals in order to communicate whether each device is defective upon receiving the control signal.

2. The apparatus of claim 1, wherein the display unit comprises a plurality of light emitting diodes which are turned on or whose color is changed for indicating a defective serial device.

3. The apparatus of claim 1, wherein the display unit comprises an On Screen Display for indicating the defective serial communication device in characters.

4. An apparatus for checking for a defect of a plurality of serial communication devices connected to a serial communication line in parallel, comprising:
   a microprocessor for outputting a control signal to designate one of the serial communication devices through the serial communication line, and for checking a defect of a thusly designated serial communication device by a response signal when receiving the response signal from the designated device; and
   a display unit for externally indicating a defective serial communication device;
      wherein the microprocessor outputs a defect signal corresponding to the defective device to the display unit, and the plurality of serial communication devices output the response signals in order to communicate whether each device is defective upon receiving the control signal; and
      wherein the display unit comprises a unit for generating a pulse or maintaining a certain value according to the defect signal.

5. An apparatus for checking for a defect of a plurality of serial communication devices connected to a serial communication line in parallel, comprising:
   a microprocessor for outputting a control signal to designate one of the serial communication devices through the serial communication line, and for checking a defect of a thusly designated serial communication device by a response signal when receiving the response signal from the designated device;
   a memory unit for storing checking results of the respective serial communication devices, and for outputting the checking results when the defect checking is completed on all the serial communication devices; and
   a display unit for displaying the checking results;
      wherein the plurality of serial communication devices output the response signals in order to communicate whether each device is defective upon receiving the control signal.

6. The apparatus of claim 5, wherein the control signal comprises an inherent address designating a specific serial communication device, the response signal comprises the inherent address and an acknowledge bit indicating whether the serial communication device is defective, and the microprocessor checks the acknowledge bit value.

7. The apparatus of claim 5, wherein the microprocessor sequentially carries out a defect checking on a next serial communication device after the defect checking is completely performed on one serial communication device.

8. The apparatus of claim 5, wherein the microprocessor determines that the designated serial communication device is defective in case no response signal is received from the designated device within a predetermined time after outputting the control signal.

9. A method of checking for a defect of a plurality of serial communication devices, comprising:
   a first step for outputting a control signal from a microprocessor through a serial communication line to designate one of the serial communication devices;
   a second step for the plurality of serial communication devices receiving the control signal and determining which device among the said plurality of serial communication devices is designated by the control signal;
   a third step for sending response signals to the microprocessor in order to communicate whether each device is defective according to a result of the second step; and
   a fourth step for the microprocessor checking a defect of a thusly designated serial communication device according to the response signal therefrom;
   a fifth step for storing the checking results of the serial communication devices from the microprocessor and outputting the checking results when the defect checking of the serial communication devices is finished; and
   a sixth step for displaying the checking results externally.

10. The method of claim 9, wherein the microprocessor sequentially carries out a defect checking on a next serial communication device after the defect checking is completely performed on one serial communication device.

11. The method of claim 9, wherein the control signal comprises an inherent address designating a specific serial communication device, the response signal comprises the inherent address and an acknowledge bit communicating whether the serial communication device is defective, and the microprocessor checks the acknowledge bit value.

12. The method of claim 9, wherein the microprocessor determines that the designated serial communication device is defective in case no response signal is not received from the designated device within a predetermined time after outputting the control signal.

* * * * *